Patented Jan. 6, 1931

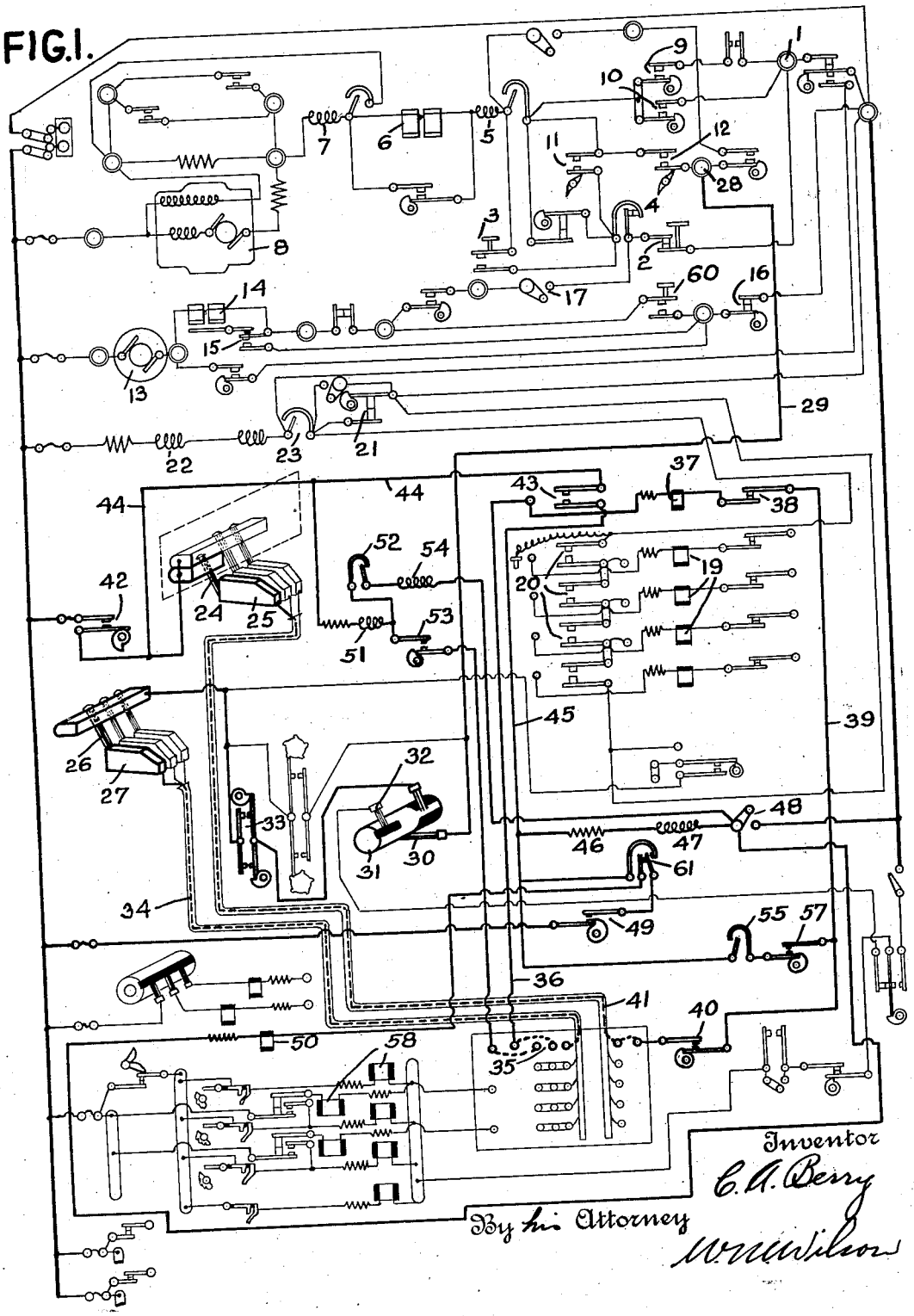

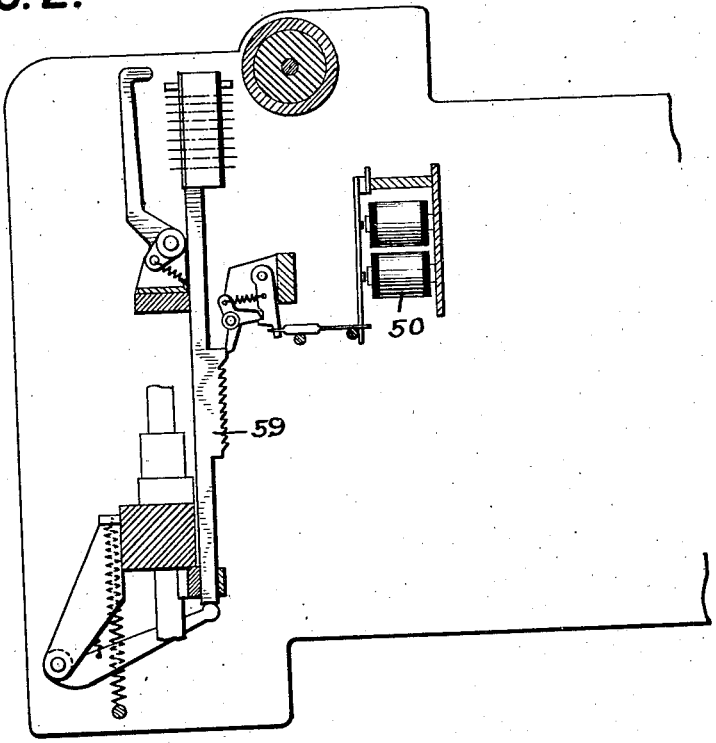

1,787,715

UNITED STATES PATENT OFFICE

CHRISTIAN A. BERRY, OF MALDEN, MASSACHUSETTS, ASSIGNOR TO THE TABULATING MACHINE COMPANY, OF ENDICOTT, NEW YORK, A CORPORATION OF NEW JERSEY

LISTING AND CHECKING MACHINE

Application filed September 24, 1928. Serial No. 307,855.

The invention relates to statistical machines and more particularly to listing machines of the tabulator class.

In listing and summing up the sales transaction of any business at the end of the day it is very necessary to keep a check of every record of sale made in order to properly check the inventory and to insure proper charges being made for the material sold. It has long been the custom to number sales checks in a given sales book serially and when said sales slips are accumulated at the end of the day to check them by number to ascertain if any are missing and then obtain an accounting for the missing slips. This checking may be done entirely by hand by manually sorting out the various sales slips separating them into separate groups according to the sales person who issued them and then arranging each group with the serial numbers on the slips in sequence and by careful scrutiny determine which numbers of the sequence are missing. Another and improved method being used extensively is to have all the data concerning each sale punched on a tabulating card to render sales analysis easily possible which method permits of an easier way to check the serial numbers than in the method previously described. In this latter method the cards are sorted by a sorting machine bringing all of a group issued by the same sales person together in proper serial order. The cards are then placed in a tabulating machine and listed, the money value being totaled in an accumulator and the total amount of sales printed for each sales person. The itemized lists of these cards which show each serial number may then be scanned to detect any missing number. It will be seen in both instances cited that a very careful scrutiny of the numbers has to be made in order that a single number missing among the vast amount of numbers may not be overlooked. It is obvious therefore that if some distinctive warning or signal could be given to advise when and where a number was missing it would greatly facilitate the task of locating such missing numbers. The applicant has accomplished this by printing a distinctive symbol opposite the number which regularly follows the missing number thus immediately giving information of exactly where a number is missing.

It is therefore an object of this invention to provide means for readily discerning the omission of a number in a group of consecutively arranged data.

Another object is to provide analyzing devices for searching non-identical index point positions on successive cards.

A further object of the invention is to provide manifesting means preferably printing devices to indicate when an index point on one record does not agree with an index point of a predetermined relationship on a companion record.

Another object of the invention is to displace analyzing devices so that by two analyzing devices non-identical index point positions are searched simultaneously.

Further objects and advantages of the present invention are disclosed in the following specification and drawings, of which:

Fig. 1 is a circuit diagram of a tabulating machine showing in strong lines the circuits provided according to the present invention;

Fig. 2 is a printing unit of the printing device of a tabulator;

Fig. 3 is a list of printed items showing indications on spots where the proper sequence of check numbers is failing.

The device according to the present invention may be preferably adapted to a known tabulator, a circuit diagram of which is shown in Fig. 1. In the following lines there is given only a brief explanation of the known arrangements of the tabulator circuits.

When start key 3 is depressed a current impulse will flow from binder post 1 over stop key contacts 2, motor control relay 4, start key contacts 3, relay 5, card feed clutch magnet 6, motor start relay 7 and tabulating motor 8 to the other side of the current source. The motor 8 once being started, start relay 5 will maintain the circuit over list and tabulating contacts 9, 10, as long as there are cards fed through the machine controlled besides by upper and lower card feed contacts 11 and 12'.

If, for example, by the usual group control device on change of a card group, tabulating motor 8 has been stopped, the total may be printed either by hand or automatically. In the first case reset key 60 is pressed so that reset motor 13 starts to operate the printing device. At the same time total clutch magnet 14 will be energized to couple the printing device with the motor and by means of contacts 15 the circuit containing the reset key is short circuited. Circuit over contacts 15 is maintained during the total taking cycle until it is opened by cam contacts 16. Total and reset operation may also be effected automatically provided switch 17 being closed over contacts 2 to binder post 1. This tabulator operation is well understood and a full description and explanation is given in the copending application of Daly and Page, Serial No. 6,980, filed February 5, 1925. It will therefore not be dwelt upon in the present case.

The automatic group control device analyzing by upper and lower brushes the cards passing through the machine includes controlling magnets 19 and coordinated contacts 20, one set being provided for each controlling column. Assuming that the perforations in the controlling columns of two succeeding cards agree, the corresponding contacts 20 will be closed. At the end of each machine cycle when auto control contacts 21 shunted with contacts 20 will be opened, there will be no effect upon motor control relays 22. If, however, in consequence of a change in the designations of two succeeding cards contacts 20 are not closed in all controlled columns, relay 23 will be deenergized and will interrupt the circuit of the motor control relay. All these functions are well known in the present machines.

According to this application one lower brush cooperating with one upper brush is used to check whether the cards running through the machine are numbered consecutively. The upper brush 24 in the units column of the card field to be checked and its coordinated contact block 25 are located one index point lower than the normal distance between the two sets of brushes. Lower brush 26 and coordinated contact block 27 cooperate with the upper brush 24 in the following way. It is obvious that brushes 24 and 26 encounter simultaneously holes in two subsequent cards when they are numbered consecutively. Then a current impulse will flow from post 28, line 29, brush 30, commutator 31, brush 32, cam contacts 33, brush 26, block 27, line 34, plugging block 35, line 36, control magnet 37, contacts 38, line 39, contacts 40, line 41, upper contact block 25, brush 24, contacts 42 to the left line of the current source. Contacts 42, 33 and 40 are normally closed and open instantaneously at the end of each machine cycle. When magnet 37 becomes energized contacts 43 will be closed and remain closed. Contacts 43 are connected by line 44 with contacts 42 and by line 45 over a resistance 46 to the relay coil 47 and switch 48 to the right hand side of the current source. Switch 48 serves to make the device according to the present invention operative or inoperative. When relay 47 is energized as occurs in the above assumed case when two cards agree, armature 61 is moved to the right. If, therefore, in the next moment contacts 49 are closed, no current may flow through magnet 50 which controls a printing type bar with a certain designation announcing that the sequence of numbers is improper. It may easily be recognized that if any improper sequence occurs group control magnet 37 will not be energized, contact 43 will remain open and relay 47 will remain in the position as shown in Fig. 1 so that magnet 50 is energized when contacts 49 are closed. Magnet 50 controls the type bar 59 as shown in Fig. 2 to print for example a mark "M" on the sheet where there is an improper sequence of numbers (see Fig. 3). As long as the group numbers follow one to each other in the proper sequence there will be no energization of magnet 37 and consequently also no printing control by the printing magnet 50.

It may be understood that the device as above described depends for its operation on the fact that the controlling index points on successive records are displaced from each by a predetermined amount in this case the distance between adjacent index points. Owing to the fact that the "9" position of a card has to be compared with the "0" position of the following card, the distance between these index points being quite different from the normal distance as above explained there must be provided a special auxiliary mechanism to enable also checking when the units column changes from "9" to "0". This result is obtained in the following way.

If there is a "9" position under the upper brush 24 it is compared in the above described way with the "8" position being at this time under the lower brush 26, but simultaneously therewith a current circuit will be established through line 44, winding 51 of relay 52, cam contacts 53 being only closed at "9" position and back over line 34, brush 26 to the other side of the current source post 28. By means of relay 52 this circuit will be maintained whereby also winding 54 of relay 55 is energized thus closing and holding the coordinated contacts 55. This circuit is held until passing of the "0" position of the following card under the upper brush 24. If this index point is under brush 24, cam contacts 57 will be closed momentarily. If there is a hole in the "0" position, that means if there is a proper sequence of numbers of the preceding and subsequent card a current impulse will be effected: from cam contacts 42 being closed during the machine cycle, over brush 24, block 25, cam contacts 40 now being closed, cam contacts 57, relay 55, winding 47 and back to the other pole over switch 48. By energizing coil 47, contacts 61 are interrupted and no printing control by magnet 50 may be effected, announcing that the cards are in proper sequence. It is obvious that in any other case no circuit through winding 47 could be established because contacts 57 are only closed if the "0" index position is under the upper brush. Therefore if there is any improper sequence the circuit of the printing magnet 50 would be closed by contacts 61 and 49 thus enabling printing of a mark.

As may be seen from Fig. 3 the mark is preferably printed simultaneously with a designation number following one or more missing numbers. The device for printing designations is of the well known kind. In Fig. 1 are shown printing magnets controlling corresponding type bars in the same way as demonstrated in Fig. 2. The printing magnets are connected in the known manner by a plug-board with the lower brushes analyzing the designation data of the card.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In a record controlled machine, an analyzer for searching index point positions on successive records, an analyzer for searching non-identical index point positions on successive records and means controlled conjointly by the analyzers for manifesting the presence of an index point on one record in the absence of an index point bearing a predetermined non-identical relationship on a companion record.

2. In a record controlled machine, an analyzing device for searching index point positions on successive records and an analyzing device for simultaneously searching non-identical index point positions on successive records and means controlled conjointly by the two analyzing devices for manifesting the presence of an index point on one record in the absence of an index point bearing a predetermined non-identical relationship on a companion record.

3. In a record controlled machine, analyzing devices for analyzing successive record designations, a printing device controlled by said analyzing devices to print data corresponding to the record designations, an analyzing device for searching index point positions on successive records and an analyzing device for simultaneously searching non-identical index point positions on successive records and printing means controlled conjointly by the two analyzing devices for printing an indication on the presence of an index point on one record in the absence of an index point bearing a predetermined non-identical relationship on a companion record.

4. In a record controlled machine, an analyzing device for searching index point positions on successive records and an analyzing device for simultaneously searching non-identical index point positions on successive records, a printing device for printing an indication on the presence of an index point on one record in the absence of an index point bearing a predetermined non-identical point bearing a predetermined non-identical relationship on a companion record, a control circuit controlled conjointly by the two analyzing devices and controlling the circuit of said indication printing device.

5. In a record controlled machine, an analyzing device for searching index point positions on successive records and an analyzing device for simultaneously searching non-identical index point positions on successive records, said analyzing devices being displaced one against each other one index less than for identical index points and means controlled conjointly by the two analyzing devices for printing an indication on the presence of an index point on one record in the absence of an index point bearing a non-identical relationship corresponding to the displaced analyzing devices on a companion record.

In testimony whereof I hereto affix my signature.

C. A. BERRY.